United States Patent
Bacher et al.

(12)

(10) Patent No.: US 6,619,575 B1
(45) Date of Patent: Sep. 16, 2003

(54) APPARATUS FOR CONTINUOUSLY RECYCLING SYNTHETIC MATERIAL, PREFERABLY POLYMERS

(76) Inventors: Helmut Bacher, Bruck/Hausleiten 17, St. Florian (AT), A-4490; Helmuth Schulz, Badstrasse 20, St. Florian (AT), A-4490; Georg Wendelin, Waldbothenweg 84, Linz (AT), A-4033

( * ) Notice: Subject to any disclaimer, the term of this patent is extended or adjusted under 35 U.S.C. 154(b) by 0 days.

(21) Appl. No.: 09/959,031

(22) PCT Filed: Apr. 6, 2000

(86) PCT No.: PCT/AT00/00083
§ 371 (c)(1),
(2), (4) Date: Oct. 15, 2001

(87) PCT Pub. No.: WO00/64654
PCT Pub. Date: Nov. 2, 2000

(30) Foreign Application Priority Data

Apr. 23, 1999 (AT) .............................................. 724/99

(51) Int. Cl.[7] .............................................. B02C 19/12
(52) U.S. Cl. ................. 241/46.11; 241/46.17; 241/154; 241/186.5
(58) Field of Search .......................... 241/46.11, 46.17, 241/152.1, 154, 186.5, DIG. 14

(56) References Cited

U.S. PATENT DOCUMENTS 4,344,579 A * 8/1982 Morita et al. ................ 241/34

FOREIGN PATENT DOCUMENTS

| CH | 630816 | * | 7/1982 |
| EP | 0496080 | * | 7/1992 |
| WO | 9322119 | * | 11/1992 |
| WO | 9318902 | * | 9/1993 |

* cited by examiner

Primary Examiner—John M. Husar
(74) Attorney, Agent, or Firm—Townsend and Townsend and Crew, LLP

(57) ABSTRACT

An apparatus for the continuously recycling of synthetic plastics material, preferably polyester, has a first receptacle (2) for the material in which movable tools (9) are disposed which comminute and/or mix the material. Pre-processed material is conveyed from this receptacle (2) through a vacuum-tightly closable conduit (18) into a second receptacle (19), the interior of which can be evacuated. Within this second receptacle (19) are movable tools (22) for processing the material. The material is conveyed from the second receptacle (19) by means of a screw (30). Another screw (15) is bearingly supported within the channel (18) and the screw volutions of this screw convey the material from the first receptacle (2) into the second receptacle (19). Between the screw volutions (52) of this further screw (15) and the second receptacle (19) there is at least one damming element (39) in the channel (18), which is disposed in the flow of the conveyed material. A complete vacuum-tightness of the second receptacle (19) and a continuous operation of the apparatus is are thereby enabled.

23 Claims, 2 Drawing Sheets

APPARATUS FOR CONTINUOUSLY RECYCLING SYNTHETIC MATERIAL, PREFERABLY POLYMERS

BACKGROUND OF THE INVENTION

The invention relates to an apparatus for the continuous recycling of synthetic plastics material, preferably polyester, comprising a first receptacle for the material, in which receptacle movable tools are disposed which comminute and/or mix the material, and from which the so-processed material is transported through a vacuum-tight closable conduit into a second receptacle, to the interior of which an evacuating device is connected and in which also movable tools are provided for processing the material, wherein that material is conveyed off the second receptacle by means of a screw.

An apparatus of initially described kind is known (AT 396,900 B). In this apparatus, the material is comminuted and mixed within the first receptacle and is pressed by the circulating tools into the conduit leading to the second receptacle. The second receptacle is evacuated in order to protect the material that is sensitive against air contact when heated and in order to decrease the drying time. The pre-processed synthetic plastics material flowing within the channel towards the second receptacle acts in tightening manner but cannot completely prevent air streaming from the first receptacle into the second receptacle. A completely tight closure of the second receptacle would be possible with a closure disposed within the channel, but then a continuous operation of the apparatus is no longer possible.

SUMMARY OF THE INVENTION

It is an object of the invention to improve an apparatus of the initially described kind so that a continuous operation is possible while assuring a sufficient vacuum-tightness of the second receptacle. Thereby, the processed material should be treated gently; in particular a degradation of the chains of the molecules should be prevented as far as possible. The invention solves this task in that a screw is bearingly supported within the conduit, the volutions of this screw conveying the material from the first receptacle into the second receptacle, wherein between the screw volutions and the second receptacle at least one damming element is provided within the conduit and disposed within the flow of the conveyed material. This damming element results in an intensive compression zone for the plastic material that is sufficiently vacuum-tight to permit the continuous operation of the apparatus.

It is known (AT E 128,898 T) to dispose a screw in a channel connecting two chambers disposed one behind the other, when seen in flow direction of the processed material. However, within this apparatus, the second chamber is not evacuated and the apparatus does not operate continuously because the screw is rotated only when in the first chamber predetermined conditions of the material are reached. Therefore, with such an apparatus, material that is sensitive against air, in particular polyester, cannot be treated successfully.

Within the spirit of the invention, important advantages are obtained if the screw is an agglomerating screw, because in that way highly sensitive agglomerated synthetic plastics material, in particular polyester, of good quality can be obtained. When compared with apparatus plasticizing the material, with an agglomerating apparatus only so much power is introduced into the processed synthetic plastics material, which mostly is introduced into the intake opening of the housing of the agglomerating screw in a pre-comminuted form, so that the particles of the synthetic plastics material are only slightly caked, but are not plasticized. Therefore, the particles of the synthetic plastics material adhere to each other or the synthetic plastics material is sintered, resulting in material that is as loose as possible when it is supplied to the second receptacle.

As it is known, within an agglomerating screw the ratio of effective screw length to the nominal diameter of the screw is less than 16. Within the spirit of the invention particular favorable values for this ratio are between 4.5 and 12. By "effective length" of the agglomerating screw, that distance is to be understood which is between the downstream end of the screw and that margin of the intake opening through which the material is supplied into the housing of the screw. Further, within an agglomerating screw, the screw volutions in the delivery zone (that is, the zone neighboring the exit opening for the material) are cut deeper than within a plasticizing screw. Within the latter, the ratio between the depth of the screw volutions and the screw outer diameter usually amounts to about 0.05 to 0.08, whereas within an agglomerating screw this ratio, as a rule, amounts to about 0.1 to 0.12.

Within the spirit of the invention, a damming element can be constructed in different manners: According to a preferred embodiment of the invention, the damming element is formed by screw volutions, the direction of their threads being opposite to those of the volutions of the screw. These inversely directed volutions, therefore, have a conveyance effect that acts opposite to that of the screw but is overcome by the latter. In such a manner, the processed material is dammed up in the zone of this reverse screw. The above-mentioned effect can be secured in a simple manner by the feature that—when measured in axial direction of the conduit—the screw is longer than the oppositely directed volutions and/or that the volutions of the screw are cut deeper than the oppositely directed volutions.

Another particularly favorable construction for the damming element of the invention is that the damming element is defined by a member having a rib that is disposed cross-wise, in particular perpendicularly, to the flow direction of the material. Such a member acts in a similar manner damming on the material conveyed by the screw, in particular, if two or more ribs are provided. In order to obtain favorable flow conditions, it is suitable to provide at least two ribs having a rounded profile and disposed one behind the other, when seen in flow direction of the material.

The reverse screw can be rotated by a separate drive means so that the desired conveyance direction (opposite to that of the screw) is obtained. However, if within the spirit of the invention the damming element is connected for common rotation with the screw, such a separate drive means can be saved, if the volutions of the oppositely acting reverse screw are correspondingly oriented. A damming member having ribs can be disposed stationarily within the conduit; however it is preferred that such a damming element is also rotated, in particular by connecting it for common rotation with the screw, because in such a manner it is not necessary to abut the damming element relative to the conduit walls.

The damming element is preferably tapered at its downstream-side end in order to collect the material traces flowing along its periphery or along its volutions. If the conduit is connected eccentrically, or if desired tangentially, to the wall of the second receptacle, what is particularly suitable within the spirit of the invention, then a particular favorable embodiment consists within the spirit of the invention in that the profile of the taper of the damming element follows substantially the profile of the wall of the second receptacle in the zone of the connection of the conduit. This ensures conditions as smooth as can be at the inner wall of the second receptacle in which the material is circulated by the circulating tools. The so-created mixing zone is not impaired by this construction.

For assembling and service reasons it is suitable to dispose the damming element within a housing member forming a section of the channel, that housing member being detachably, but tightly, connected to the housing of the screw. The tight connection is necessary in order to take up the high pressures occurring in the zone of the conduit, without any loss, which pressures can reach 300 bar and more. If the damming element is constituted by a member carrying ribs, then it is suitable within the spirit of the invention to cut the volutions of the agglomerating screws deeper than the smallest dimension of the gap occurring between the periphery of the ribs of the damming element and the inner wall of the conduit, when measured in radial direction. As it can be seen, the damming element must not be formed radially symmetric to the axis of the conduit; on the contrary, it may have also the form of a toothed wheel, most of the material passing the damming element through its tooth spaces.

As already mentioned, some of the materials to be recycled, in particular polyester, are very sensitive to humidity when heated. In order to avoid that such material is adversely affected by its processing within the first receptacle, within the spirit of the invention the first receptacle is also closed vacuum-tightly and is connected to an evacuating device. The tight connection of the filling opening of this receptacle can be obtained with a sluice operating substantially continuously, for example, a cellular wheel sluice or the like, in order to enable a continuous filling of the receptacle.

As a rule, the intake opening of the housing of the screw carrying the processed material off the second receptacle is disposed at least substantially at the level of the tools circulating within the receptacle to optimally utilize the centrifugal action exerted by these tools onto the material as well as a spatula-like pressing-in of the material by the tools. Within such an embodiment, however, the invention places the mouth of the conduit in the second receptacle higher than the orbit of the tools circulating at the bottom region of the receptacle around at least one vertical axis. This avoids that material particles, which were not fully pre-processed within the first receptacle, are immediately introduced in the housing of the output screw by the circulating tools when such particles enter the second receptacle, so that such particles do not remain sufficiently long within the second receptacle. However, it is desired that the material particles remain for a predetermined time within the second receptacle by reasons of sufficient drying of humid particles or particles containing moisture. The described higher disposition of the intake opening within the second receptacle has the effect that the material particles entering the second receptacle are taken along by the material stream exerted by the tools circulating within the receptacle. This material stream has the effect that the particles rise along the receptacle wall so that particles entering this receptacle are at first taken along and moved upwardly and only then—after a certain dwell time—can reach the zone of the intake opening of the delivery screw. This meets the requirement to keep particles that are as loose as possible within the second receptacle for as long as possible under an elevated temperature and a vacuum. The comminuting action onto the partially sintered particles entering the second receptacle is favored within the spirit of the invention if in addition to the tools circulating in the bottom zone of the second receptacle further tools, preferably coaxially disposed tools, in particular beating elements, are provided, the orbit of which is disposed above that of the tools disposed within the bottom zone of the receptacle. Suitably, the orbit of these further tools is disposed at the level of the mouth of the channel in the second receptacle.

Further features and advantages of the invention can be seen from the specification of embodiments of the subject matter of the invention which are schematically shown in the drawings.

DESCRIPTION OF THE PREFERRED EMBODIMENTS

Figure 1:
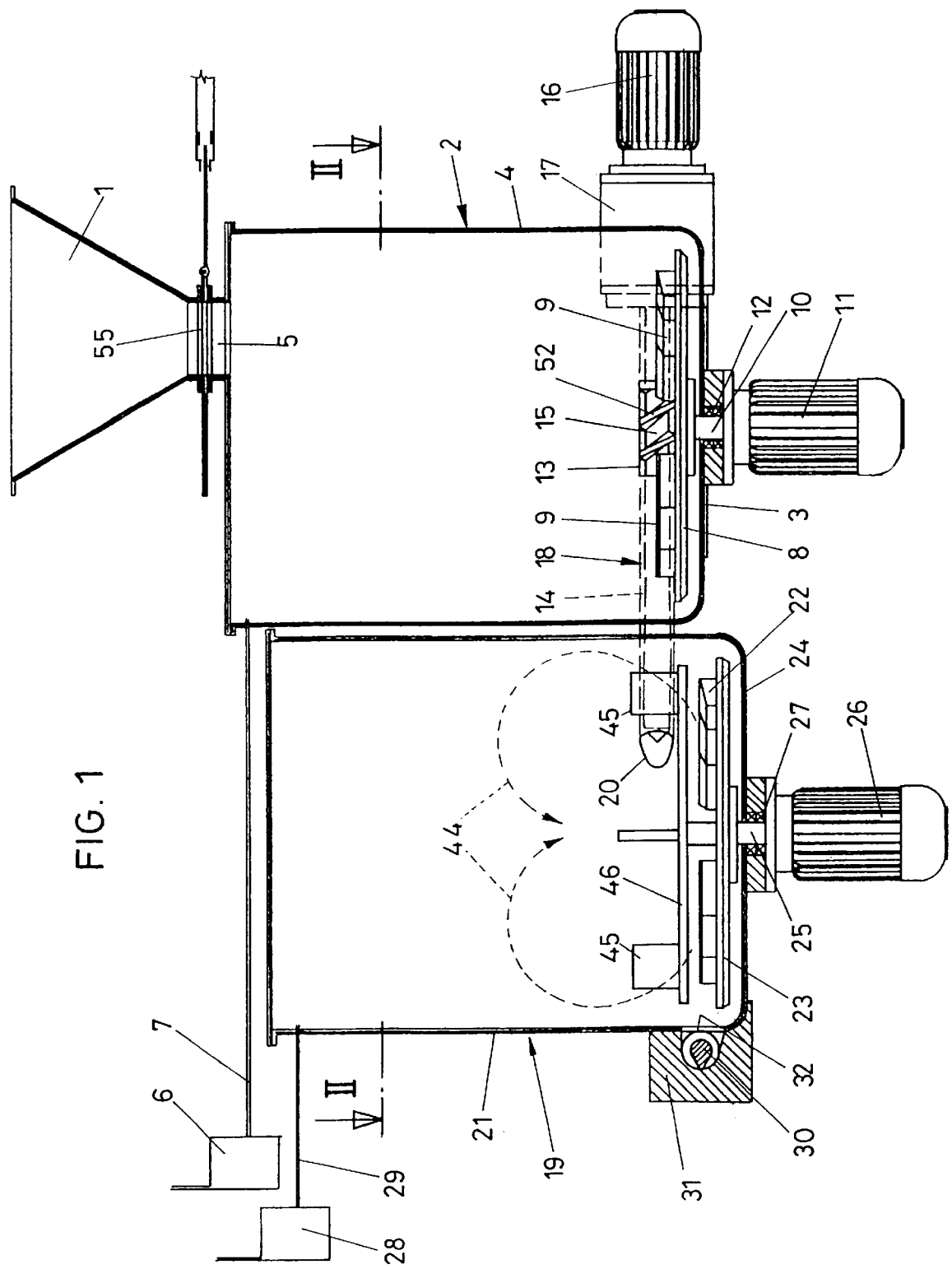
FIG. 1 shows a vertical section through the apparatus along line I—I of FIG. 2.
Figure 2:
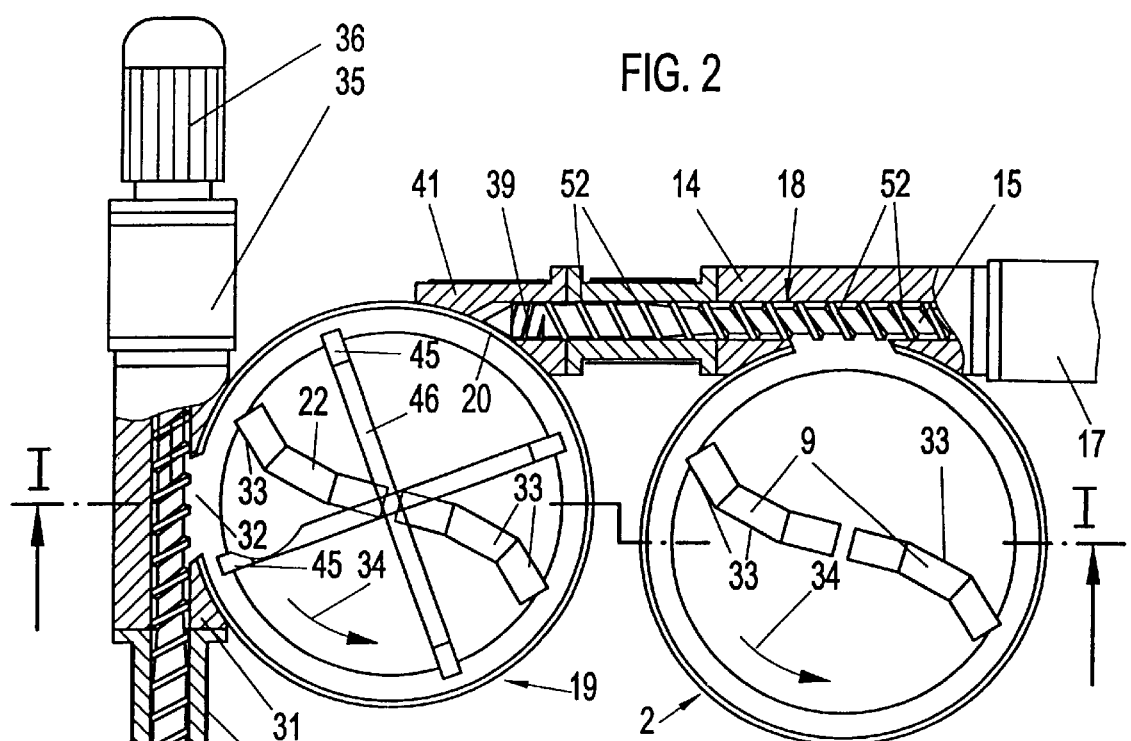
FIG. 2 shows a section taken along line II—II of FIG. 1.
Figure 3:
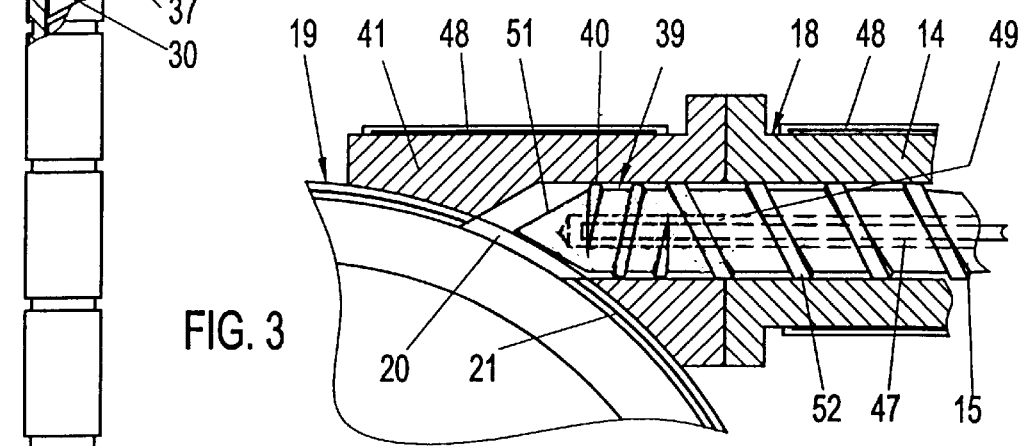
FIG. 3 shows the damming element of the present invention in the form of a reverse screw in a horizontal section and on an enlarged scale.

Within the embodiment according to FIGS. 1, 2 and 3, the material to be processed, for example polyester—but, if the occasion should arise, also polyamides and other hygroscopically sensitive plastics materials or such materials which are sensitive to oxygen—is introduced through a filling hopper 1 into a first receptacle 2 that is rotationally symmetrical to a vertical axis and has a planar horizontal bottom 3 and vertical side walls 4. In order to be able to process the material within the receptacle 2 under vacuum, the intake opening 5 can be vacuum-tightly closed by a closure gate 55. For evacuating the receptacle 2 there is provided an evacuating device 6 that has a vacuum pump connected via a line 7 to the receptacle 2. Tools 9 mounted on a disk 8 rotate in a bottom region of the receptacle around the vertical axis of the receptacle and are driven for rotational movement via a shaft 10 by a motor 11. The shaft 10 intersects the bottom 3 of the receptacle 2 and is vacuum-tightly sealed by means of a seal 12. An opening 13 is provided in the side wall 4 of the receptacle 2, through which the material processed within the receptacle 2 reaches into the housing 14 of a screw 15. For this, the centrifugal action exerted by the circulating tools 9 onto the material within the receptacle 2 is made use of, and additionally the tools 9 may press the material into the opening 13 like a spatula. The screw 15 may be, but is not necessarily, an agglomerating screw, meaning that the depth of the screw volutions 52 within the delivery zone, therefore in the region of the mouth of the housing 14, is greater than within a usual plasticizing screw, and that the ratio between the effective length of the agglomerating screw and its nominal diameter is less than 16, preferably between 4.5 and 12. In the embodiment shown this ratio amounts to about 6.6.

As FIG. 2 shows, the screw 15 has a core diameter that continuously increases in the conveyance direction at least over a section of its axial length, so that the depth of its screw volutions 52 decreases in that direction, in order to increase the pressure exerted onto the material conveyed by the screw in conveyance direction. The screw is driven for rotational movement around its axis by a motor 16 via a gear means 17. The housing 14 of the screw forms a conduit 18 via which the material is conveyed by the screw 15 from the first receptacle 2 into the second receptacle 19. The mouth 20 of the conduit 18 positioned in the vertical side wall 21 of the receptacle 19 constitutes an intake opening for the pre-processed material and is disposed above the orbit of tools 22 circulating in the second receptacle 19 around its vertical axis. These tools are mounted in a similar manner as within the first receptacle 2 on a disk 23 driven for rotational movement by a motor 26 via a shaft 25 intersecting the bottom 24 of the receptacle 19. A seal 27 seals the shaft 25 vacuum-tightly with respect to the bottom 24. For processing the material within the receptacle 19 under vacuum, this receptacle 19 can also be evacuated with an evacuating device 28, the vacuum pump of which is connected via a line 29 to the receptacle 19.

For discharging the readily processed material out of the second receptacle 19, a screw 30 is tangentially connected to the receptacle, and the material is pressed from the receptacle 19 through an opening 32 into the housing 31 of the screw by the centrifugal action exerted onto the material by the tools 22. As within the receptacle 2, this pressing-in can be assisted by a spatula-like action of the tools 22, and for this the tools 9, 22 each are provided with working edges 33 (FIG. 2) angularly bent with respect to the radial direction opposite to the direction of circulation (arrows 34). The screw 30 is driven by a motor 36 via a gear means 35. Its housing 31 is suitably provided on its outside with resistance heating means 37 so that the material conveyed by the screw 30 can be kept at the desired temperature. The conveyance direction of the screw 30 is indicated by an arrow 38.

At that end of the screw 15 that neighbors the mouth 20, a damming element 39 is disposed within the conduit 18, that dams up the material conveyed by the screw 15, so that the pressure onto the material increases over the axial length of the damming element 39. This axial length is small, when compared with the axial length of the screw 15; in the example shown it amounts to about one-eighth of the latter. This increased pressure acting on the material has the effect that the conduit 18 is reliably vacuum-tightly sealed, so if that the vacuum within the first receptacle 2 is cancelled, for whatever reasons, the vacuum in the second receptacle 19 remains unchanged. This is of importance in order to maintain optimal operating conditions within the receptacle 19 when particles of synthetic plastics material, for example polyester or polyamide, for example for the production of agglomerate, are processed that are sensitive to moisture or oxygen when heated.

Within the embodiment shown in FIGS. 1 to 3, the damming element 39 is formed by screw volutions 40 disposed at the outlet end of the member forming the screw 15, which volutions, therefore, are of one-single piece with the screw 15, but the direction of the thread pitch is opposite to that of the screw 15. Therefore, when the screw 15 is rotated, screw threads 40 try to convey the material in a direction towards opening 13 of the housing 14, that is, in a direction opposite to the direction of conveyance of the screw 15. The substantially greater axial length of the screw 15, when compared with the axial length of the damming element 39, has the effect that the conveyance action of the screw volutions 40 is overcome by the conveyance action of the screw 15. However, the first-named conveyance action increases the pressure on the material in the zone of the damming element thus further compressed material is pressed along the screw threads 40 in a direction towards the mouth 20 of the conduit 18, or, respectively, the material is pressed past the screw threads 40, meaning that the screw threads 40 are "overrun", if these screw threads, as shown in FIG. 3, have a smaller outer diameter than the screw threads 52 of the screw 15. Alternatively, if both kinds of screw threads have the same outer diameter, the inner diameter of the housing 14 could be correspondingly increased in the zone of the damming element 39; however, the first-named variant is preferred.

It would be possible to constitute the member forming the damming element 39 as a member that is separated from the screw 15 and to rotate the damming element with its own drive means, for example by means of an axial rod intersecting the core of the screw 15, which core is formed as a hollow shaft. However, the constructional effort is much less if either the damming element 39 is formed in one single piece with the screw 15, or indeed as a member being separated from the screw 15, but connected for common rotation therewith. The latter variant has the advantage that the damming element 39 that constitutes a member subjected to extreme high stresses can be separately exchanged, in particular for service or replacement purposes. In order to facilitate this work, the section of the housing 14 surrounding the damming element 39 is also constituted by a separate member 41 (FIG. 3) that is detachably and tightly connected with the remaining section of the housing 14. The tight connection is necessary with respect to the desired air-tight closure and also for the reason that the high pressures (up to 300 bar and more) occurring within the channel 18 must be taken up without leakage occurring at the connection location.

As FIG. 3 shows, that front end of the damming element 39 that neighbors the mouth 20 of the conduit 18 is tapered. This taper 51 has the effect that, on the one hand, the material traces flowing past the damming element 39 in the zone of its periphery are collected and, on the other hand, the profile is adapted to the profile of the side wall 21 of the receptacle 19. This results in the advantage that the sintered particles can be kept small in size and that the circulation movement of the plastics mass driven by the tools around the receptacle axis is obstructed as little as possible in the zone of the mouth 20.

Figure 4:
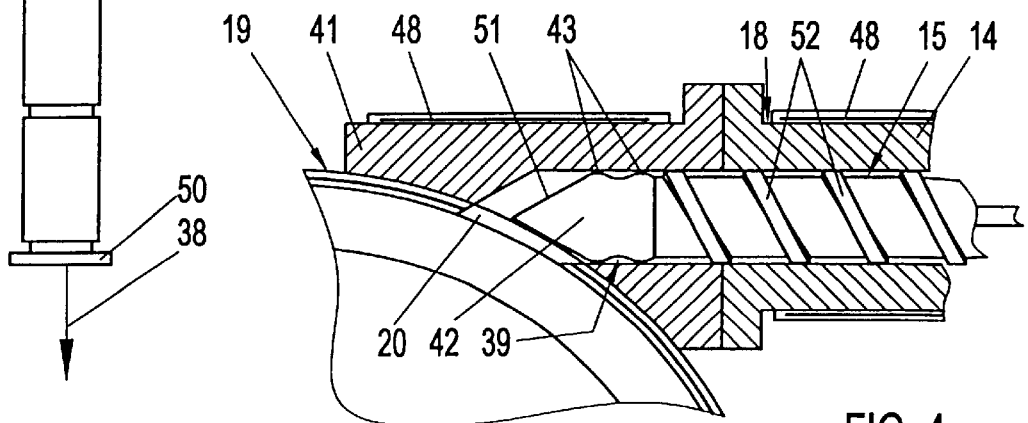
FIG. 4 shows in a similar manner a variant.

A variant for this is shown in FIG. 4. Here, the damming element 39 is formed by a member 42 connected to the front side of the screw 15, which member has two ribs 43 disposed across the flow direction of the conveyed material and having a rounded profile, the greatest diameter of these ribs being somewhat less than the inner diameter of the housing 14 or of the section 41 connected to it. Also such a damming member 39 dams up the synthetic plastic material flowing past its outer periphery and condenses thereby the material so that a vacuum-tight closure is obtained. The taper 51 of the damming element 39 has the same effect as was described in connection with FIG. 3.

A further variant consists in that at least one damming disk disposed across the axial direction of the screw 15 is used as the damming member 39.

As FIG. 1 shows, the mouth 20 of the channel is disposed spaced apart above the orbit of the tools 22 within the receptacle 19. This avoids that a material particle that leaves the mouth 20 of the conduit 18 is immediately conveyed into the intake opening 32 of the housing 31 of the discharge screw 30 by the circulating tools 22, in which event the particle does not remain sufficiently long in the receptacle 19 to be sufficiently dried. To the contrary, the particle discharged from the mouth 20 is taken along by the material flow rising along the side wall 21 of the receptacle 19 and is conveyed towards the inner zone of the receptacle (see the arrows 44 in FIG. 1). Therefore, there occurs the desired turbulence of the particles within the receptacle 19. This can still be increased if further circulating tools 45, preferably in form of striking elements, are disposed spaced above the tools 22, preferably at the level of the mouth 20 of the channel 18, which further tools are driven by an upwardly extending elongation of the shaft 25 via a star carrier 46.

The housing 14 of the screw 15 and/or the housing member 41 accommodating the damming element 39 may also be provided with heating devices 48, preferably in form of resistance heating elements. However, it is advisable to cool the screw 15 and the member disposed at its front end and formed as a damming element 39, because these elements are subjected to high stresses and, therefore, to heat influence. For this, the core of the screw 15 and, if desired, also the member 42 have a central bore 49 (FIG. 3) into which a cooling line 47 extends. Cooling can be effected by means of a heat transfer oil, cooling water or air. By a thermostat control of this cooling and/or of the heating devices 48, 37, the desired temperatures of the screws 15, 30, of the damming element 39 and of the material conveyed by these elements can be kept constant.

The screw 30 at the outlet of the second receptacle 19 may be an extruder screw or, if desired, a mere conveyor screw supplying the material to a further processing location or to a location where the material is made use of. Suitably, degassing devices (not shown) are provided within the housing 31 of this screw 30.

It is particularly favorable to connect the housing 31 of the screw 30 tangentially to the second receptacle 19, because in such a manner the motor 36 and the member 50 (FIG. 2) carrying the outlet openings for the material can be disposed at opposite front ends of the housing 31. This avoids discharge openings disposed laterally on the housing 31, resulting in a deviation of the material and, therefore, a power loss. Of course, however, the housing 31 may be, if desired, also connected radially or eccentrically to the receptacle 19, and also it is possible to connect the housing 14 of the screw 15 to the first receptacle 2 not tangentially, as this is shown in FIG. 2, but radially or eccentrically with respect to the receptacle 2.

What is claimed is:

1. An apparatus for the continuous recycling of a plastic material comprising first and second receptacles each including movable tools disposed therein for working plastic material therein; an evacuating device connected to the second receptacle for maintaining a vacuum in the second receptacle; a vacuum-tight conduit between the first and second receptacles for transporting the plastic material from the first receptacle to the second receptacle; a screw conveyor rotatably disposed in the conduit and having transport volutions for transporting the plastic material from the first receptacle to the second receptacle; and at least one damming element located in the conduit between the transport volutions and the second receptacle and arranged in the flow of plastic material through the conduit.

2. An apparatus according to claim 1 wherein the screw comprises an agglomerating screw.

3. An apparatus according to claim 1 wherein the damming element is defined by damming volutions on the screw conveyor which have a sense of rotation that is opposite to a sense of rotation for the transport volutions of the screw conveyor.

4. An apparatus according to claim 3 wherein the screw conveyor has an axial length which is greater than an axial length occupied by the damming volutions of the screw conveyor.

5. An apparatus according to claim 3 wherein the transport volutions of the screw conveyor have a depth greater than a depth of the damming volutions of the screw conveyor.

6. An apparatus according to claim 3 wherein an outer diameter of the damming volutions of the screw conveyor is smaller than an outer diameter of the transport volutions of the screw conveyor.

7. An apparatus according to claim 1 wherein the damming element comprises at least one rib in the conduit arranged transverse to a flow direction of the plastic material in the conduit.

8. An apparatus according to claim 7 wherein the at least one rib has a rounded profile.

9. An apparatus according to claim 7 wherein a periphery of the at least one rib defining the damming element is spaced from an inner surface of the conduit to define a radial gap therebetween, and wherein a depth of the screw volutions is greater than a smallest dimension of the gap.

10. An apparatus according to claim 1 including a separate member defining the damming element, the separate member being attached to and rotating with the screw conveyor.

11. An apparatus according to claim 1 wherein the damming element comprises a body having a tapered end proximate the second receptacle.

12. An apparatus according to claim 11 wherein the second receptacle includes an upright side wall and the conduit is arranged tangentially to the side wall.

13. An apparatus according to claim 12 wherein the conduit is connected to an exterior of the side wall, and wherein the tapered end of the member of the damming element substantially follows a profile of the side wall in a region of a connection between the conduit and the side wall.

14. An apparatus according to claim 12 wherein the conduit includes first and second coaxial conduit sections sealingly and detachably connected to each other, and wherein the screw conveyor is disposed in the first section and the damming element is disposed in the second section of the conduit.

15. An apparatus according to claim 1 wherein the first receptacle is sealed, and including an evacuation device connected to the first receptacle for vacuumizing an interior of the first receptacle.

16. An apparatus according to claim 1 including another screw conveyor disposed in a housing for removing plastic material from the second receptacle, the housing having an intake opening arranged no lower than substantially a level of the movable tool in the second receptacle.

17. An apparatus according to claim 16 wherein the housing of the other screw conveyor is tangentially attached to an exterior of the second receptacle.

18. An apparatus according to claim 1 wherein the second receptacle has an opening communicating with an interior of the conduit for feeding plastic material into the second receptacle, wherein the movable tool comprises an orbital tool rotating about a vertical axis, and wherein the opening is arranged at a level higher than an orbit of the orbital tool.

19. An apparatus according to claim 18 including a rotating beating element arranged in the second receptacle having an orbit which is above the orbit of the orbital tool, and wherein the orbit of the orbital tool is at a bottom region of the second receptacle.

20. An apparatus according to claim 19 wherein the orbit of the beating element is substantially at the same level as the opening in the second receptacle communicating with the conduit.

21. An apparatus according to claim 1 including at least one cooling element arranged within at least one of the screw conveyor and the damming element.

22. An apparatus according to claim 1 including at least one heating device arranged at at least one of a housing of the conduit and the damming element.

23. An apparatus for the continuous recycling of a plastic material comprising first and second receptacles each including movable tools disposed therein for working plastic material therein; an evacuating device connected to the second receptacle for maintaining a vacuum in the second receptacle; a vacuum-tight conduit between the first and second receptacles for transporting the plastic material from the first receptacle to the second receptacle; a screw conveyor rotatably disposed in the conduit and having volutions for transporting the plastic material from the first receptacle to the second receptacle; and at least one damming element located in the conduit between the volutions and the second receptacle, arranged in the flow of plastic material through the conduit and causing the formation of a compression zone proximate the second receptacle where the plastic material in the conduit forms a vacuum-tight seal in the conduit.

\* \* \* \* \*